United States Patent [19]
Gates, Jr.

[11] 3,952,154
[45] Apr. 20, 1976

[54] AUTOMATIC AUDIO SOURCE SELECTOR FOR STEREO ENTERTAINMENT CENTER

[76] Inventor: William A. Gates, Jr., 3228 E. Delcoa Drive, Phoenix, Ariz. 85032

[22] Filed: Oct. 2, 1974

[21] Appl. No.: 511,104

[52] U.S. Cl. .................. 179/1 SW; 179/100.1 PS
[51] Int. Cl.² ............................... H04Q 1/18
[58] Field of Search ............... 179/1 SW, 37, 1 HF, 179/1 VC, 1 VL, 100.1 C, 100.1 VC, 100.11, 100.1 PS; 325/47, 51

[56] References Cited
UNITED STATES PATENTS

| | | | |
|---|---|---|---|
| 2,766,378 | 10/1956 | Sundin et al. | 179/1 SW |
| 3,493,681 | 2/1970 | Richards | 179/100.1 C |
| 3,806,820 | 4/1974 | Uchiyama | 179/1 SW |
| 3,809,812 | 5/1974 | Smith, Sr. | 179/1 SW |

Primary Examiner—Kathleen H. Claffy
Assistant Examiner—George G. Stellar
Attorney, Agent, or Firm—Warren F. B. Lindsley

[57] ABSTRACT

An automatic electronic control system for a home entertainment center, the system utilizing audio signal sensors for the preferential selection of the record player or the tape deck as a signal source but with provision for returning to the tuner upon the cessation of the signal from either of the preferred sources. A manual mode is also provided which utilizes proximity switches.

8 Claims, 12 Drawing Figures

AUDIO SENSING CIRCUIT

AUTOMATIC AUDIO SOURCE SELECTOR FOR STEREO ENTERTAINMENT CENTER

BACKGROUND OF THE INVENTION

A wide variety of equipment is currently available for use in the home to provide high quality musical entertainment. A typical home entertainment center of this type includes stereo record players, magnetic tape decks and AM-FM tuners, all of which are selectably employed to drive a dual channel amplifier and speaker system. A major disadvantage of such systems, however, is that their operation often becomes a nuisance for the operator because of the constant attention required by the complex combination of equipment. This is especially objectionable when the center is put to use as a means for providing background music at a social event when the host is busy attending to other matters. It would be a great convenience in such cases if the host could set the phonograph or the tape deck in operation and then forget it, knowing that when all the records or tapes had run out, the equipment would automatically switch to the tuner and continue operating in that mode until he again had an opportunity to set up a new stack of records or install a new tape.

SUMMARY OF THE INVENTION

In accordance with the invention claimed, an automatic selection system is provided for use with a stereo home entertainment center, the system serving to greatly simplify the control of the system and relieving the operator of the need to give his constant attention to maintaining its operation.

It is therefore one object of this invention to provide an automatic control system for a home entertainment center of a type that typically includes a phonograph (record player), a tape deck and an AM-FM tuner.

Another object of this invention is to provide in such an automatic control system a high degree of convenience in terms of the operator's ability to select an operating mode or an audio source simply by touching a lighted spot on the face of the equipment panel.

A further object of this invention is to provide in such a system a capability for the system to select automatically an audio signal from the phonograph or from the tape deck when such a signal is present and to return automatically to the tuner at the termination of the playing of a number of records or of a tape deck, the system responding in this case to the termination of the audio signal from the phonograph or the tape channel.

A still further object of this invention is to provide in such a system a capability for allowing the operator to select either the automatic mode for the selection of the audio source or a manual mode which disables such automatic selection.

A still further object of this invention is to provide in such a system a front panel on which a lighted message appears as each of the operating modes or signal sources selected, the message indicating the selected mode and audio source.

Yet another object of the present invention is to provide in such a system a capability for utilizing a set of remote switches for duplicating at a remote location the same selection capability as provided at the front panel of the equipment.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
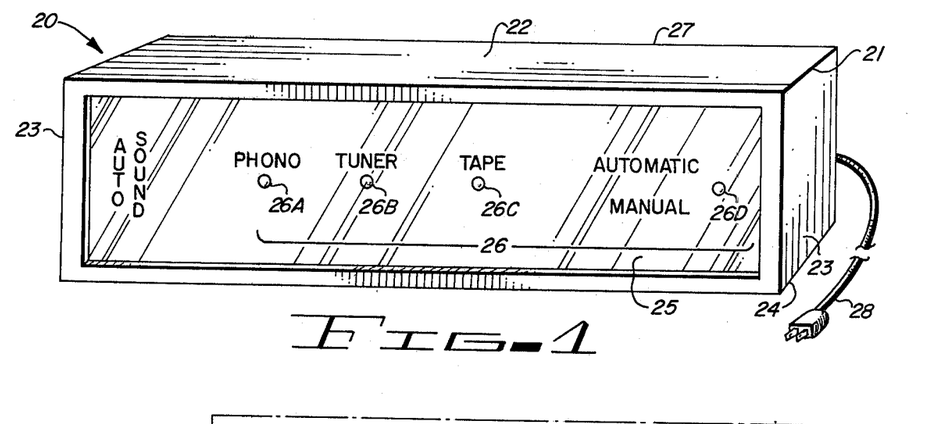
FIG. 1 is a perspective view of the automatic audio source selector embodying the present invention.

Referring more particularly to the drawing by characters of reference, FIG. 1 discloses an automatic audio source selector unit 20 for use with a home entertainment center of the type typically comprising a phonograph or record player, a tape unit, a tuner for AM and FM, an amplifier and a speaker system. The selector unit 20 which serves as a control center for such a system comprises a housing or cabinet 21 with top 22, sides 23 and bottom 24 fabricated from wood or other attractively furnished material and with a glass front 25.

The glass front 25 has an opaque black background which is broken by a number of captions in different colors. At the left of the panel is shown the name of the manufacturer of the unit, as represented in FIG. 1, for illustration only by the name AUTO SOUND. Arranged serially across the top of glass front 25 are the captions PHONO, TUNER and TAPE, and at the right of panel 25, the caption AUTOMATIC directly above another and final caption MANUAL. While the black background is opaque, the captions are of transparent colors which are not visible unless lighted from behind the glass front 25 in which case they become readily apparent and easily recognized. Below each of the three captions, PHONO, TUNER and TAPE and directly to the right of the pair of captions, AUTOMATIC and MANUAL, there is a red light emitting diode (LED) 26 which is visible from the front of the panel when energized, there being appropriately located apertures in the black background of front 25 to pass the light from the LED's 26.

Across the rear panel 27 (hidden from view) of unit 20 are a number of terminals and jacks for making connections to the record player, tuner, tape unit, amplifier and remote controls. Also connected at the rear panel 27 is the a-c power cord 28.

When the unit 20 is connected to an a-c power source via cord 28 and when the record player, tuner, tape unit and amplifier are connected at the rear panel 27, the unit 20 assumes control of the entertainment center.

When a-c power is first applied, unit 20 initially selects the TUNER channel and switches into the automatic mode. In this mode only, the three captions AUTO-SOUND, TUNER and AUTOMATIC will be illuminated and visible in green and only the LED's 26A, 26C and 26D associated with the captions PHONO, TAPE and AUTOMATIC/MANUAL will be energized and visible in red. Assuming the tuner has been energized, an audio signal from the tuner will be transmitted by the unit 20 to the amplifier and speaker system.

If the record player or the tape unit is subsequently set into operation, the unit 20 recognizes an audio signal from either of these units, automatically assigns priority to such a signal and switches from the tuner signal to the record player or tape signal, transmitting that signal to the amplifier and speaker system. Simultaneously with the selection of the record player or tape signal, the appropriate caption PHONO or TAPE, respectively, becomes visible and the caption TUNER becomes invisible while LED 26A or 26C is extinguished and LED 26B is energized. Upon the termination of the audio signal from the record player or the tape unit, the unit 20 automatically reselects the audio signal from the tuner and the initial illumination pattern for front 20 reappears.

If the operator wishes to utilize the manual mode of opeation, he simply moves his finger within half an inch of LED 26D. The proximity of the operator's finger to LED 26D causes the unit 20 to switch from the automatic mode to the manual mode as will be indicated by the disappearance of the caption AUTOMATIC and the illumination of the caption MANUAL. Assuming now that all three audio sources are connected and available, the operator may select any one of them by simply moving his finger into proximity with LED 26A, 26B or 26C to select, respectively, the PHONO, TUNER or TAPE source which will then be indicated by the illumination of the appropriate caption and the de-energization of the associated LED 26A, 26B or 26C. To return again to the automatic mode, the operator again moves his finger into proximity with LED 26D.

The unit 20 is also adapted to be connected to a remote control panel which permits the utilization of the above described operating modes by means of the remote panel.

Figure 2:
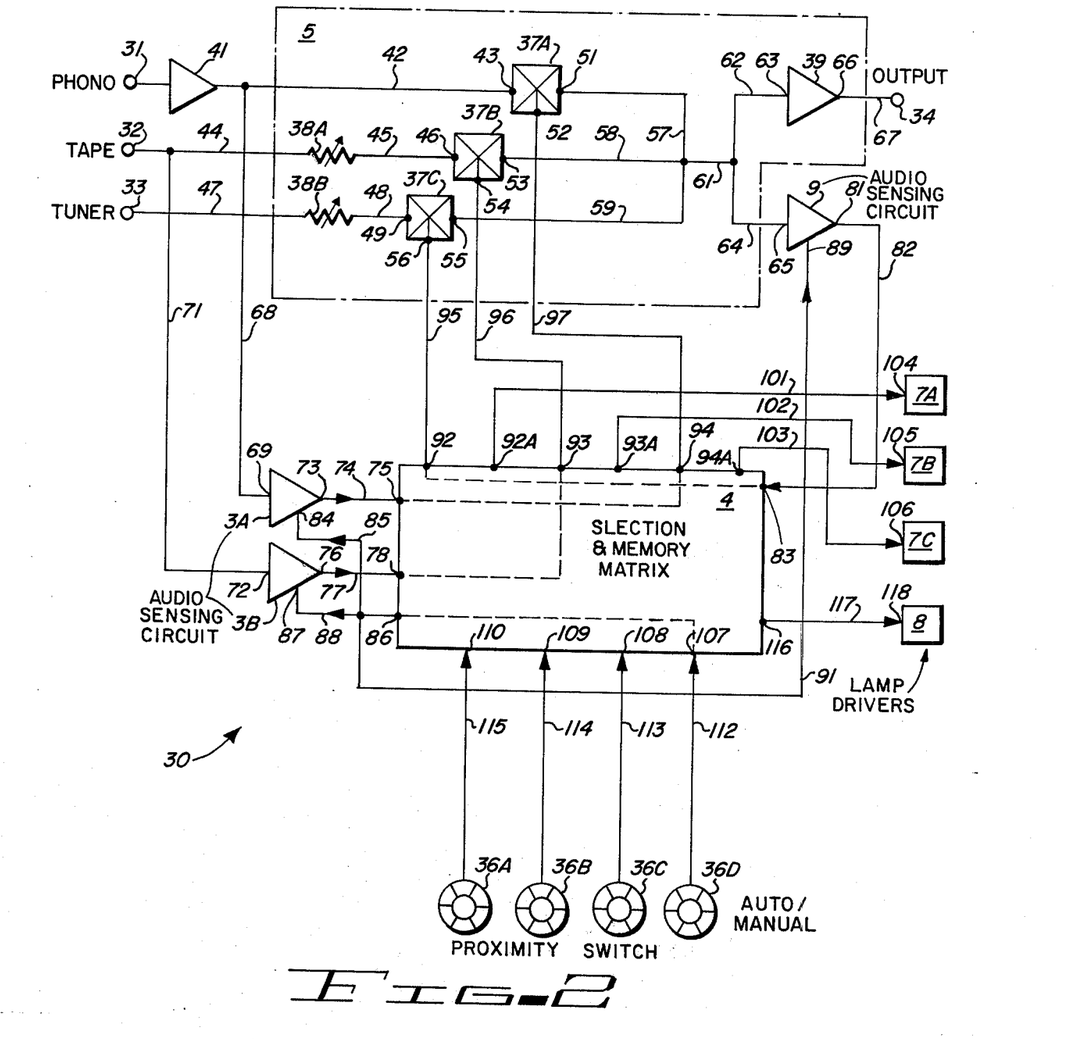
FIG. 2 is a block diagram of the electronic system which provides the automatic control functions.

FIG. 2 discloses in block diagram form the electronic system 30 which is located inside cabinet 21 and which is utilized by unit 20 to provide the operating modes described above. System 30 of FIG. 2 comprises PHONO, TAPE and TUNER input terminals 31, 32 and 33, respectively, output terminal 34 for connection to an amplifier and speaker system, a phono preamplifier 41, audio sensing circuits 3A and 3B, a selection and memory matrix 4, an audio switching network 5, a third audio sensing circuit 9, lamp driver circuits 7A, 7B, 7C and 8, and proximity switches 36A, 36B, 36C and 36D.

Within circuit block 5, which has been identified as the audio switching network, are three electronic switches 37A, 37B and 37C, two volume controls 38A and 38B and an amplifier 39.

In FIG. 2, audio signals from the phonograph, the tape deck and the tuner are connected at input terminals 31, 32 and 33, respectively. The phonograph signal from terminal 31 is of a relatively lower amplitude than the tape and tuner signals and for this reason, the phonograph signal is amplified by means of amplifier 41. Amplifier 41 utilizes a commercially available integrated circuit amplifier such as the RCA 3048 with appropriate external resistive and capacitive elements for coupling, impedance-matching and control of frequency response. The application of such devices for audio amplifications is well known and not claimed as new or novel in this invention. The amplified phonograph signal is delivered at output terminal of amplifier 41 and is carried by line 42 to input terminal 43 of electronic switch 37A. The tape signal from terminal 32 passes through line 44, variable resistance volume control 38A and line 45 to input terminal 46 of electronic switch 37B and the tuner signal passes from input terminal 33 through line 47, volume control 38B and line 48 to input terminal 49 of electronic switch 37C.

Each of the electronic switches 37A, 37B, and 37C has an input terminal, an output terminal and a control terminal. Switch 37A for example has in addition to its input terminal 43 an output terminal 51 and a control terminal 52. If the control terminal 52 is grounded, the signal present at input terminal 43 is transmitted to output terminal 51; if control terminal 52 is not grounded, the signal is not transmitted to the output terminal. Switch 37B has an output terminal 53 and a control terminal 54 and switch 37C has an output terminal 55 and a control terminal 56.

The output terminals 51, 53 and 55 of switches 37A, 37B and 37C are connected via lines 57, 58 and 59, respectively, to a common signal bus 61 from which connection is made by line 62 to input terminal 63 of amplifier 39 and by line 64 to input terminal 65 of audio sensor 9. Output terminal 66 of amplifier 39 is connected by line 67 to audio output terminal 34. Assuming there are audio signals present at input terminals 43, 46 and 49 of all three switches, 37A, 37B and 37C, respectively, it is possible to select any one of the three audio signals and transmit it to bus 61 by grounding the appropriate control terminal 52, 54 or 56.

The audio sensors 3A, 3B and 9, matrix 4 and switches 37A, 37B and 37C cooperatively provide the automatic selection function. The amplified phonograph signal from line 42 is connected via line 68 to input terminal 69 of audio sensor 3A and the tape signal from line 44 is connected via line 71 to input terminal 72 of audio sensor 3B. Output terminal 73 of sensor 3A is connected by line 74 to terminal 75 of matrix 4, output terminal 76 of sensor 3B is connected by line 77 to terminal 78 of matrix 4 and output terminal 81 of sensor 9 is connected by line 82 to terminal 83 of matrix 4. Audio sensor 3A has an enable terminal 84 which is connected by line 85 to terminal 86 of matrix 4 and sensor 3B has an enable terminal 87 which is connected by line 88 to terminal 86 of matrix 4. A positive voltage level at terminal 86 and thus at enable terminals 84 and 87 disables sensors 3A and 3B while a zero or ground level at terminals 86, 84 and 87 causes sensors 3A and 3B to be enabled. In the enabled condition, sensor 3A or 3B responds to the presence of an audio signal at its input terminal by delivering a positive signal at its output terminal while in the disabled condition the output terminal will be at ground potential regardless of the presence or absence of a signal at the input.

Audio sensor 9 operates in a different manner. The absence of a signal rather than the presence of a signal at input terminal 65 of sensor 9 produces a positive signal at output terminal 81 when enable terminal 89 is grounded. Enable terminal 89 is connected to terminal 86 of matrix 4 by line 91. Sensors 3A, 3B and 9 are thus simultaneously enabled by a ground signal at terminal 86 or disabled by a positive signal at terminal 86, the ground signal being present when the automatic mode is set and the positive signal being present when the manual mode is set.

Assuming now that the automatic mode is set and that sensors 3A, 3B and 9 are enabled, automatic selection of the audio source occurs in the following manner: When the equipment is first energized, there is initially no signal present on bus 61 or input terminal 65 of sensor 9 and the resulting positive signal present at output terminal 81 of sensor 9 is delivered by line 82 to terminal 83 of matrix 4. The positive signal present at terminal 83 causes terminal 92 of matrix 4 to be grounded. Terminal 92 is connected by line 95 to control terminal 56 of switch 37C and terminal 56 is thus also grounded thereby enabling switch 37C so that the tuner output signal is transmitted via switch 37C to bus 61, amplifier 39 for delivery to output terminal 34. If the phonograph is now energized and a signal from the phonograph appears at input terminal 31 and consequently on lines 42 and 68, sensor 3A responds by delivering a positive signal to terminal 75 of matrix 4. The positive signal at terminal 75 of matrix 4 causes terminal 94 to be grounded. By virtue of line 97 connecting terminal 94 of matrix 4 to control terminal 52 of switch 37A, terminal 52 is also grounded, switch 37A is consequently enabled and the phonograph signal from terminal 31 passes through amplifier 41, line 42, switch 37A, line 57, bus 61 and amplifier 39 to output terminal 34. At the same time, the positive signal at terminal 75 causes terminals 92 and 93 to rise to a positive value, which positive value is present also at terminals 54 and 56 of switches 37B and 37C, respectively, causing switches 37B and 37C to be disabled or turned off so that only the signal from the phonograph reaches bus 61.

A tape signal applied at terminal 32 rather than a phonograph signal at terminal 31 causes a similar response. In this case, sensor 3B delivers a positive signal to terminal 78 thereby causing terminal 93 to be grounded and terminals 92 and 94 to go positive. The grounding of terminal 93 and the consequent enabling of switch 37B allows the tape signal from terminal 32 to pass through line 44, volume control 38A, line 45, switch 37B, line 58, bus 61, line 62, amplifier 39 and line 67 to output terminal 34.

Now upon the cessation of the audio signal at line 31 or 32, sensor 9 responds to the absence of a signal at its input terminal 65 by delivering after a delay period a positive signal at its output terminal 81, which positive signal is delivered via line 82 to terminal 83 of matrix 4. The positive signal at terminal 83 causes terminal 92 to be grounded and terminals 93 and 94 to rise in a positive level. By virtue of its connection to terminal 92 by line 95, control terminal 56 of switch 37C is grounded, switch 37C is enabled and the tuner signal from terminal 33 passes through line 47, control 38B, line 48, switch 37C, line 59, bus 61, line 62, amplifier 39 and line 67 to output terminal 34.

Associated with each of the three terminals 92, 93 and 94 of matrix 4 are three complimentary terminals 92A, 93A and 94A, respectively. When one of the three terminals 92, 93 or 94 is grounded, its complimentary terminal rises to a positive voltage and the positive voltage at 92A, 93A or 94A is transmitted to lamp driver 7A, 7B or 7C via lines 101, 102 or 103, respectively. Thus, for example, when terminal 92 is grounded to select the tuner, line 92A is positive and the positive level is carried to input terminal 104 of lamp driver 7A. Lamp driver 7A responds by illuminating the caption TUNER and extinguishing LED 26B. At the same time, grounded terminals 93A and 94A transmit zero voltage signals via lines 102 and 103 to inputs 105 and 106 of lamp drivers 7B and 7C to prevent illumination of the captions PHONO and TAPE while energizing LED's 26A and 26C.

Proximity switches 36A, 36B, 36C and 36D, which are located adjacent LEDS's 26A, 26B, 26C and 26D, respectively, permit manual operation of system 30. If the system is initially in the automatic mode and the operator moves his finger within one half inch of proximity switch 36D, a low energy signal is coupled into the switch 36D from the operator's body, the signal being transmitted to terminal 107 of matrix 4 via line 112. The signal delivered to terminal 107 is amplified and processed to cause terminal 86 to rise to a positive level to disable sensors 3A, 3B and 9. At the same time, a positive voltage signal appears at terminal 116 of matrix 4 and is delivered via line 117 to input terminal 118 of lamp driver 8 to cause the caption MANUAL to be illuminated on front panel 25 and causing the caption AUTOMATIC to be extinguished.

The system is thus placed in the manual mode and it is possible now to switch manually to the desired audio source by moving a finger within one half inch of the appropriate LED or proximity switch. Thus, for example, to switch to the phonograph signal, the operator moves his finger near LED 26A and proximity switch 36A. By virtue of electronic circuits within matrix 4 a ground signal appears at terminal 94 to enable switch 37A. As in the automatic mode when terminal 94 is driven to a zero level, terminals 92 and 93 are driven to a positive level and switches 37B and 37C are turned off. At the same time, terminal 94A rises to a positive level and terminals 92A and 93A are grounded thus delivering the appropriate signals to lamp drivers 7A, 7B and 7C.

While the overall operation of system 30 has now been described with reference to FIG. 2, additional clarity will be added by descriptions which are to follow and which deal in greater detail with the individual parts or circuit blocks of FIG. 2.

Figure 3:
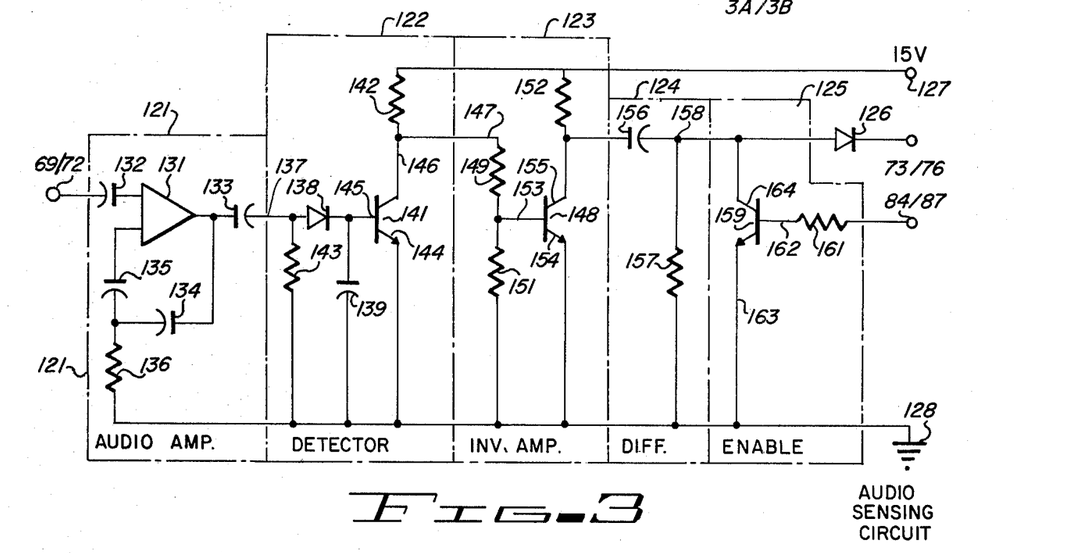
FIG. 3 is a circuit diagram of an audio sensing circuit employed in the invention and which is represented in FIG. 2 by reference numbers 3A and 3B.

The audio sensing circuit 3A, 3B shown in FIG. 3 comprises an input terminal 69/72, an audio amplifier stage 121, a detector stage 122, an inverter-amplifier stage 123, a differentiator 124, an enable network 125, a + 15 volt supply terminal 127, an output terminal 73/76, an enable terminal 84/87 and a ground terminal 128.

Amplifier stage 121 utilizes an integrated circuit amplifier 131 which may be an RCA 3048, an input coupling capacitor 132 and output coupling capacitor 133 and a feedback network comprising capacitors 134 and 135 and resistor 136.

The output signal from amplifier stage 121 is coupled through capacitor 133 to the input terminal 137 of detector state 122 which comprises a diode 138, a capacitor 139, a transistor 141 and resistors 142 and 143. Resistor 143 is connected between the input terminal 137 and ground terminal 128 to provide a path to ground for d-c leakage current through capacitor 133 of amplifier stage 121 and thereby to insure that input terminal 137 is substantially at ground potential in the absence of an audio signal. Diode 138 and capacitor 139 are serially connected between input terminal 137 and ground terminal 128, the series combination serving as a detector/integrator network as diode 138 conducts only during the positive half cycle of the a-c audio signal appearing at input terminal 137. Transistor 141 has its emitter 144 connected to ground terminal 128, its base 145 connected to the positive terminal of capacitor 139 and its collector 146 connected through resistor 142 to 15 volt supply terminal 127. At the initiation of an audio signal appearing at input terminal 137, capacitor 139 begins to charge through diode 138 very quickly charging to a voltage which is adequate to forward bias the base emitter junction of transistor 141 and causing a current to flow from base 145 to emitter 144 thereby switching transistor 141 to an "on" state wherein transistor 141 exhibits a low impedance from collector 146 to emitter 144. As transistor 141 switches to the "on" state the voltage at collector 146 and at output terminal 147 which is connected to collector 146 falls from a high positive value to just a fraction of a volt above ground or zero potential. Collector 146 and output terminal 147 remain near ground potential as long as an audio signal persists at input terminal 137 and because of the excess charge developed on capacitor 139 which continues to supply base emmiter current. After the audio signal disappears, transistor 141 remains in an "on" state for as long as forty-five seconds after the signal is gone. The delay thus provided by capacitor 139 prevents the sensing circuit from responding to short interruptions in the audio signal.

Inverter-amplifier stage 123 comprises a transistor 148 and three resistors 149, 151 and 152. Resistor 151 is connected between base 153 and grounded emitter 154 of transistor 148, resistor 149 is connected between output terminal 147 of stage 122 and base 153 of transistor 148, and resistor 152 is connected from +15 volt supply terminal 127 to collector 155 of transistor 148. In the absence of an audio signal at input terminal 69/72 or when transistor 141 is turned off, terminal 147 is at a high positive value and a current flows from terminal 147 through resistor 149 to base 153 and from base 153 to emitter 154 of transistor 148 to ground terminal 128, the base emitter current setting transistor 148 to its "on" state and thereby causing the collector 155 to be at a low voltage near ground potential. When an audio signal appears at terminal 69/72 and when transistor 141 consequently turns on, terminal 147 falls to a low value of voltage and no longer supplies emitter base curent through resistor 149. As a result, transistor 148 "turns off" and the voltage at collector 155 rises rapidly to a high value.

Differentiator 124 comprises a series network including a capacitor 156 and a resistor 157, the free end of the capacitor being connected to collector 155 of transistor 148 and the free end of resistor 157 being connected to ground terminal 128. The voltage across resistor 157 and hence at differentiator output terminal 158 which is at the junction of capacitor 156 and resistor 157 is the differential of the voltage applied to differentiator 124 by collector 155 of transistor 148. As indicated earlier the voltage at collector 155 rises rapidly from near zero to a relatively high positive value. The differential of such a voltage transistion is a positive pulse of voltage which appears at terminal 158, and a part of the energy developed in this positive pulse is delivered as a current pulse flowing from terminal 158 through diode 126 to sensor output terminal 73/76.

Enable circuit 125 comprising transistor 159 and resistor 161 completes the sensor circuit 3A/3B. Resistor 161 is connected between enable terminal 84/87 and base 162 of transistor 159, emitter 163 of transistor 159 is connected to ground terminal 128, and collector 164 of transistor 159 is connected to differentiator output terminal 158. When a positive signal is applied at enable terminal 84/87 a current flows from terminal 84/87 through resistor 161 to base 162 and from base 162 to emitter 163 and ground terminal 128, the base emitter current turning transistor 159 on and effectively shorting terminal 158 to ground through the low impedance, collector to emitter of transistor 159. In this condition, the sensor circuit is disabled because transistor 159 prevents the delivery of an output pulse to terminal 73/76. When terminal 84/87 is at or near ground potential no base emitter current is supplied to transistor 159 through resistor 161, transistor 159 is thus turned off and the sensor circuit 3A/3B is thus enabled and capable of responding to an audio input signal.

Figure 4:
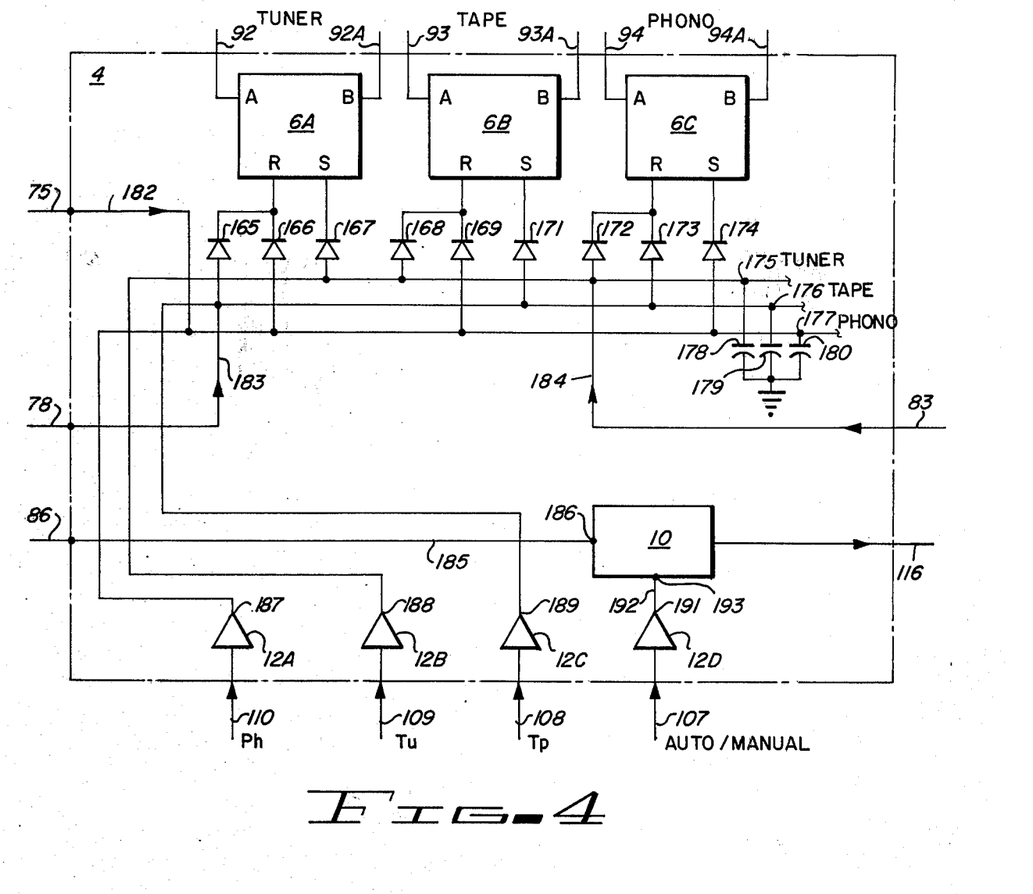
FIG. 4 is a wiring diagram including circuit elements and larger circuit blocks and their interconnections in a selection and memory matrix shown as circuit block 4 of FIG. 2.

Internal features of matrix 4 are shown in FIG. 4 to include three set/reset flip-flops 6A, 6B and 6C, each having complementary output terminals A and B and each having a "set" input S and a "reset" input R, the "set" and "reset" inputs being driven through a diode matrix comprising diodes 165, 166, 167, 168, 169, 171, 172, 173 and 174, a phono bus 177, a tape bus 176, a tuner bus 175, capacitors 178, 179 and 180, one end of each being connected to ground terminal 128, the other end to one of the buses 175, 176 and 177 so that each of the three buses has a capacitor to ground, four proximity amplifiers, 12A, 12B, 12C and 12D, amplifier 12A driving bus 177, amplifier 12B driving bus 176, amplifier 12C driving bus 175, and amplifier 12D driving an automatic/ manual flip-flop 10.

Input terminals 75, 78 and 83 of matrix 4 are connected respectively to phono bus 177, tape bus 176 and tuner bus 175 by respective connecting lines 182, 183 and 184. Output terminal 86 is connected by line 185 to output terminal 186 of flip-flop 10. The A and B outputs of flip-flop 6A correspond respectively to output terminals 92 and 92A, the A and B outputs of flip-flop 6B correspond respectively to output terminals 93 and 93A, and the A and B output terminals of flip-flop 6C correspond respectively to output terminals 94 and 94A of matrix 4. Input terminals 110, 109, 108 and 107 are connected respectively to the input terminals of proximity amplifiers 12A, 12B, 12C and 12D.

Flip-flop 6A has two states, a "set" state and a "reset" state. In the "set" state, the A output is low (near ground potential) and the B output is high (at a positive potential) while in the "reset" state, the A output is high and the B output is low. The state can be changed from "reset" to "set" by applying a positive pulse to input terminal S or from "set" to "reset" by applying a positive pulse to input terminal R. If the flip-flop is already in the "set" state, a positive pulse at the S input has no effect and a positive pulse at the R input has no effect if the "reset" state already exists. Flip-flops 6B and 6C are identical to flip-flop 6A.

The flip-flops 6A, 6B and 6C are set or reset by positive signals apppearing on buses 175, 176 and 177, the positive signals being supplied in the automatic mode from input terminals 75, 78 and 83 and in the manual mode by the output terminals 187, 188 and 189, respectively of amplifiers 12A, 12B and 12C. A positive pulse on bus 175 for example is passed by diode 167 to the S input of flip-flop 6A, it is passed by diode 168 to the R input of flip-flop 6B, and by diode 172 to the R input of flip flop 6C. Flip-flop 6A is thus "set" and flip-flops 6B and 6C are "reset." It is to be noted that from each of the three buses 175, 176 and 177, there are three diodes connected one carrying a "set" pulse to one of the three flip-flops 6A, 6B and 6C, the other two diodes carrying reset pulses to the other two flip-flops. Thus diode 167 is connected from bus 175 to the S input of flip-flop 6A, diode 171 is connected from bus 176 to the S input of flip-flop 6B, diode 174 is connected from bus 177 to the S input of flip-flop 6C, diodes 165 and 166 are respectively from busses 176 and 177 to the R input of flip-flop 6A, diodes 168 and 169 are connected respectively from buses 175 and 177 to the R input of flip-flop 6B and diodes 172 and 173 are connected respectively from buses 175 and 176 to the R input of flip-flop 6C. It is thus seen that a positive pulse on any one of the three buses 175, 176 or 177 will set one of the three flip-flops 6A, 6B, or 6C and it will reset the other two, this being the operation described earlier as required to enable one of the switchers 37A, 37B or 37C and to disable the other two.

The proximity amplifiers 12A, 12B, 12C and 12D receive very low level a-c signals at their input terminals from terminals 110, 109, 108 and 107 respectively which are connected to the proximity switches 36A–36D shown in FIG. 2, the a-c signals being capacitively coupled to switches 36A–36D from the operator's body as he moves his finger near the switches. In response to these low level a-c signals, the proximity amplifiers deliver positive pulses to buses 175, 176 and 177 or to flip-flop 10. Thus, for example, if the operator moves his finger near proximity switch 36A an a-c signal is coupled through terminal 110 to the input of amplifier 12A and amplifier 12A supplies a positive pulse from its output terminal 187 its output terminal 187 to bus 177.

An a-c signal at terminal 107 which is connected to the input terminal amplifier 12D produces a positive pulse at output terminal 191 of amplifier 12D, output terminal 191 being connected by line 192 to input terminal 193 of flip-flop 10. The operating characteristics of flip-flop 10 are such that each succeeding positive pulse appearing at input terminal 193 changes the state of flip-flop 10 so that the signal level at output terminal 186 is changed from a "zero" or low state to a "one" or high state or from a high state to a low state, the low state corresponding to the automatic mode in which the low signal delivered at output 186 and delivered to output terminal 86 by line 185 enables the audio sensors 3A, 3B and 9 while a high signal delivered to terminal 86 corresponding to the manual mode disables the audio sensors.

Figure 5:
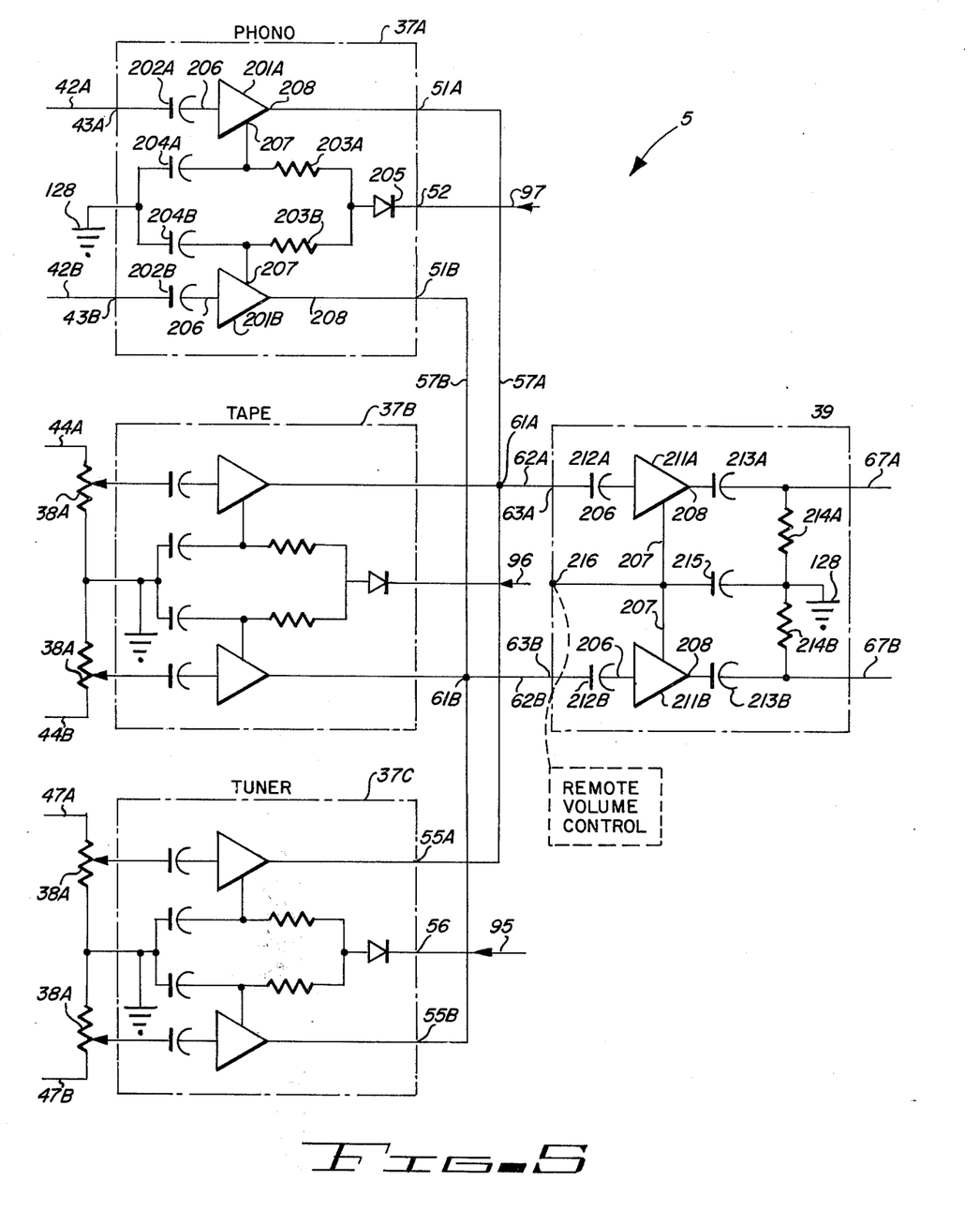
FIG. 5 is a circuit diagram of the audio switching network which is shown as circuit block 5 of FIG. 2 for stereo operation.

Although FIG. 2 appears to show only single or monaural signal channels, the system is intended to be adaptable to stereo systems as well and has been so implemented in the first embodiment. FIG. 5 shows the actual circuit configuration of the audio switching network which is identified by the number 5 in FIG. 2. It will be noted that for each audio signal line in FIG. 2 there are two corresponding signal lines in FIG. 5. Thus, for example, signal line 42 of FIG. 2 represents signal lines 42A and 42B of FIG. 5. Lines 44, 47, 51, 55, 57, 61, 62, 63 and 67 in FIG. 2 similarly represent pairs of lines in FIG. 5 such as 44A and 44B, 47A and 47B, etc. The same correspondence holds for input and output terminals such as, for example, the single input terminal 43 shown in FIG. 2 and the dual terminals 43A and 43B in FIG. 5.

Internal details of the switches 37A, 37B and 37C are shown in FIG. 5 to include in each switch two amplifiers 201A and 201B, two input coupling capacitors, 202A and 202B, two ground terminal resistors 203A and 203B, two ground terminal capacitors 204A and 204B, and a grounding diode 205. Amplifiers 201A and 201B are commercially available as integrated circuit packages such as the one manufactured by Motorola, a part number MFC6040. Each of the amplifiers 201A and 201B has one input terminal 206, a ground terminal 207 and an output terminal 208. Feedback and frequency compensating networks are not shown.

The grounding network including capacitors 204A and 204B, resistors 203A and 203B and diode 205 is employed to control the operation of the switch 37A, 37B or 37C causing it to pass or block the audio signals appearing at the input terminals 42A and 42B, 44A and 44B or 47A and 47B. Consider, for example, switch 37A. Unless control line 97 is grounded, there is no direct current path to ground from ground terminals 207 of amplifiers 201A and 201B which are then as a consequence inoperative and not capable of passing signals from input to output terminals. When line 97 is grounded, however, by terminal 94 of matrix 4, ground currents flow from ground terminals 207 through resistors 203A and 203B, diode 205 and line 97 to terminal 94. While the grounding of these terminals could have been effected without the use of the series resistors 203A and 203B, these resistors and the capacitors 204A and 204B connected from ground terminals 207 of amplifiers 201A and 201B respectively to ground terminal 128 have been provided to prevent the occurence of a large "popping" sound during the operation of switch 37A.

Amplifier 39 is also shown in FIG. 5 to have two channels rather than one as suggested in FIG. 2, the dual channel amplifier 39 including two integrated circuit amplifiers, 211A and 211B, input coupling capacitors 212A and 212B, output coupling capacitors 213A and 213B, terminating resistors 214A and 214B, a ground terminal capacitor 215, input terminals 63A and 63B, output terminals 67A and 67B and remote volume control line 216.

Amplifier packages 211A and 211B are again typified by Motorola's MFC6040. Input, ground and output terminals are again identified, respectively, by the numerals 206, 207 and 208.

An adjustable resistor connected between line 216 and ground at a remote location allows remote control of the volume of the sound system. As the resistance of the adjustable resistor is increased, the supply voltage appearing across amplifiers 211A and 211B is decreased and the amplitude of the output signals at terminals 208 is decreased accordingly. Capacitor 215 connected from ground terminals 207 to ground terminal 128 eliminates electrical noise originating in the remote adjustable resistor or coupled into control line 216.

Figure 6:
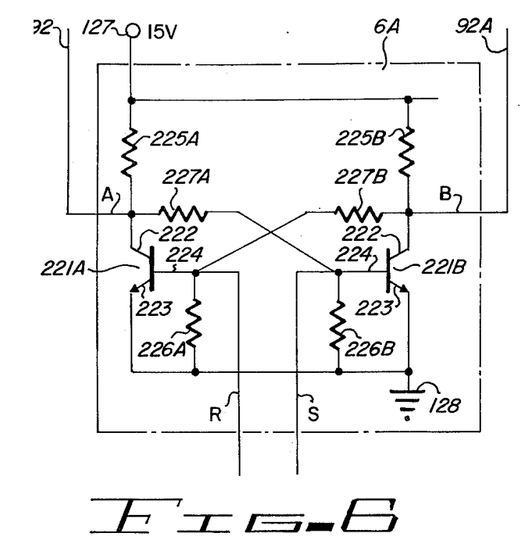
FIG. 6 is a circuit diagram of a Set/Reset Flip-Flop which is employed in the Selection and Memory Matrix of FIG. 4 and which is represented in FIG. 4 by circuit blocks 6A, 6B and 6C.

FIG. 6 shows a typical flip-flop of the type employed as flip-flop 6A, 6B, or 6C in FIG. 4. Flip-flop 6A includes, as shown in FIG. 6, two transistors 221A and 221B each having a collector 222, an emitter 223 and a base 224, two collector resistors 225A and 225B, two base emitter resistors 226A and 226B and two coupling resistors 227A and 227B. Emitters 223 of transistors 221A and 221B are connected directly to ground terminal 128. Resistor 225A is connected between +15 volt supply terminal 127 and collector 222 of transistor 221A and resistor 225B is connected between terminal 127 and collector 222 of transistor 221B. Resistor 226A is connected between base 224 and emitter 223 of transistor 221A and resistor 226B is connected between base 224 and emitter 223 of transistor 221B. Coupling resistor 227A is connected between collector 22 of transistor 221A and base 224 of transistor 221B while coupling resistor 227B is connected between collector 222 of transistor 221B and base 224 of transistor 221A.

The flip-flop of FIG. 6 has two stable states. In the first state, transistor 221A is "on" while transistor 221B is "off"; in the second state, transistor 221A is "off" and transistor 221B is "on." The first state is here called the "reset" state and the second is the "set" state. Either state is stable because of the cross-coupled resistors 227A and 227B one of which supplies base drive current from the collector of the "off" transistor to the base of the "on" transistor. For example, in the "reset" state, the voltage present at collector 222 of transistor 221B is relatively high because transistor 221B is "off." A current thus flows from collector 222 of transistor 221B through resistor 227B to base 224 of transistor 221A. Because transistor 221A is thus held in the "on" condition, however, the collector 222 of transistor 221A is near ground potential and no current flows from the collector 222 through resistor 227A to base 224 of transistor 221B.

The flip-flop 6A may be changed from either state to the other by supplying a positive current pulse to the base of the "off" transistor or by supplying a negative pulse to the base of the "on" transistor.

Figure 7:
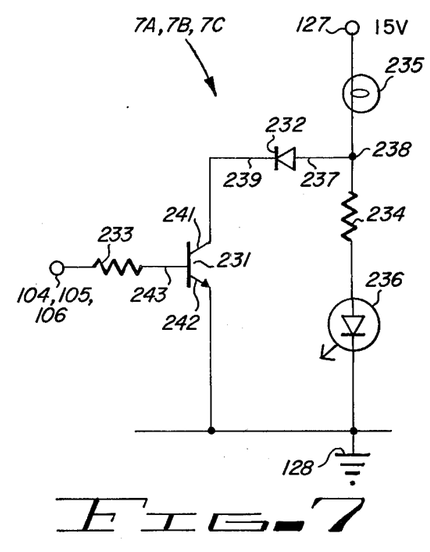
FIG. 7 is a circuit diagram of a lamp driver circuit which is employed in the invention and represented by blocks 7A, 7B and 7C in FIG. 2.

Each of the lamp drivers 7A, 7B and 7C of FIG. 2 has a circuit configuration as shown in FIG. 7, the circuit comprising an NPN transistor 231, a diode 232 and two resistors 233 and 234 which control current through a lamp 235 and the LED, 236. The LED 236 represents one of the LED's shown in FIG. 1 as 26A, 26B and 26C.

Serially connected between +15 volt terminal 127 and ground terminal 128 in the order named are lamp 235, resistor 234 and LED 236 with LED 236 polarized to pass current to ground. Connected in parallel with serially connected resistor 234 and LED 236 is a second series network including diode 232 and transistor 231, the anode 237 of diode 232 being connected to common point 238 between resistor 234 and lamp 235, the cathode 239 of diode 232 connected to the collector 241 of transistor 231 and the emitter 242 of transistor 231 connected to ground terminal 128. Resistor 233 is connected between input terminaal 104, 105, 106 and base 243 of transistor 231.

Operation of lamp driver 7A, 7B, 7C occurs as follows: When input terminal 104, 105, 106 is grounded, transistor 231 is "off" for want of base current and a small current limited by resistor 234 flows from +15 volt terminal 127 through lamp 235, resistor 234 and through LED 236 to ground terminal 128. The current flowing is too low to cause lamp 235 to be lighted but is adequate to light LED 236. When input terminal 104, 105, 106, is driven positive, however, base drive current flows from terminal 104, 105, 106 through resistor 233 to base 243 and emitter 242 to ground terminal 128. Transistor 231 is thus turned "on" causing the voltage at common point 238 to fall to approximately 1 volt above ground so that nearly the full 15 volt supply voltage appears across lamp 235. A substantial current thus flows from terminal 127 through lamp 235, diode 232 and transistor 31 to ground terminal 128 so that lamp 235 is fully illuminated while essentially no current flows through resistor 234 and LED 236. Thus, for example, in FIG. 2 when terminal 92 is low to select the tuner, terminal 92A is high and by virtue of line 101 connecting terminal 92A to terminal 104 of lamp driver 7A terminal 104 is also high and the lamp 235 behind the caption TUNER will be energized while the LED 236 or 26B will be extinguished as desired.

Figure 8:
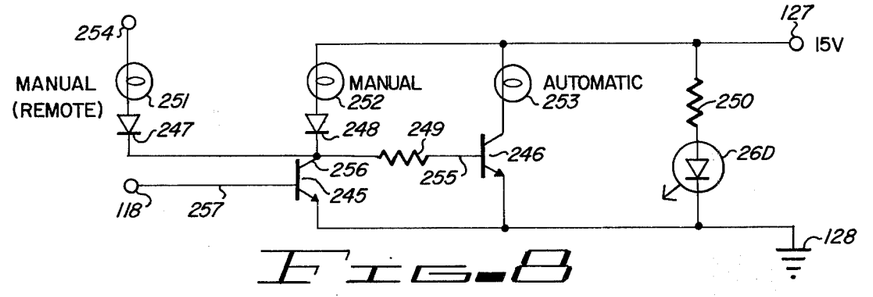
FIG. 8 is a circuit diagram of another lamp driver circuit employed in the invention and shown as circuit block 8 of FIG. 2.

FIG. 8 shows circuit details of automatic/manual lamp driver 8. Lamp driver 8 utilizes two NPN transistors 245 and 246, two diodes, 247 and 248 and resistors 249 and 250 to control the energization of lamps 251, 252 and 253 and of LED 26D, LED 26D identifying the location of the automatic/manual proximity switch 36D on front panel 25.

LED 26D and resistor 250 are serially connected between supply terminal 127 and ground terminal 128 so that LED 26D is always energized when voltage is present at terminal 127.

Lamp 253 which lights the caption AUTO on front panel 25 is serially connected with transistor 246 between supply terminal 127 and ground terminal 128 so that lamp 253 is energized only when transistor 246 is turned on.

Lamp 252, diode 248 and transistor 245 are serially connected between positive supply terminal 127 and ground terminal 128 while lamp 251, diode 247 and transistor 245 are serially connected between a second positive supply terminal 254 and ground terminal 128. Lamps 251 and 252 are thus energized only when transistor 245 is turned on.

Resistor 249 is connected between base 255 of transistor 246 and collector 256 of transistor 245. When transistor 245 is turned on by means of a positive signal at its base 257 and at control terminal 118, its collector 256 is approximately at the potential of ground terminal 128 so that essentially no current flows from collector 256 through resistor 249 and into base 255 of transistor 246. Transistor 246 is thus turned off when transistor 245 is turned on.

On the other hand, when transistor 245 is turned off by a zero voltage or ground signal at input terminal 118 and base 257, collector 256 rises to a positive voltage approximately equal to the potential of the greater of the two supply terminals 127 and 254 and a small current insufficient in amplitude to illuminate lamp 251 or 252 flows from terminal 127 through lamp 252 and diode 248 to collector 256 or from terminal 254 through lamp 251 and didode 247 to collector 256 and from collector 256 through resistor 249 into base 255 of transistor 246 turning transistor 246 on. Transistor 246 is thus turned on when transistor 245 is turned off.

It has thus been shown that a positive signal at terminal 118 causes transistor 245 to be turned on and lamps 251 and 252 to be energized illuminating the caption MANUAL at the remote panel and at front panel 25 and causing transistor 246 to be turned off and hence lamp 253 to be deenergized. It has also been shown that a ground signal at terminal 118 causes transistor 245 to be turned off thus deenergizing lamps 251 and 252, and turning transistor 246 on thereby energizing lamp 253 to illuminate the caption AUTOMATIC on front panel 25.

The presence of diodes 247 and 248 permits the use of different values of supply voltage at terminals 127 and 254 and hence different lamp voltage rating for lamps 251 and 252.

Figure 9:
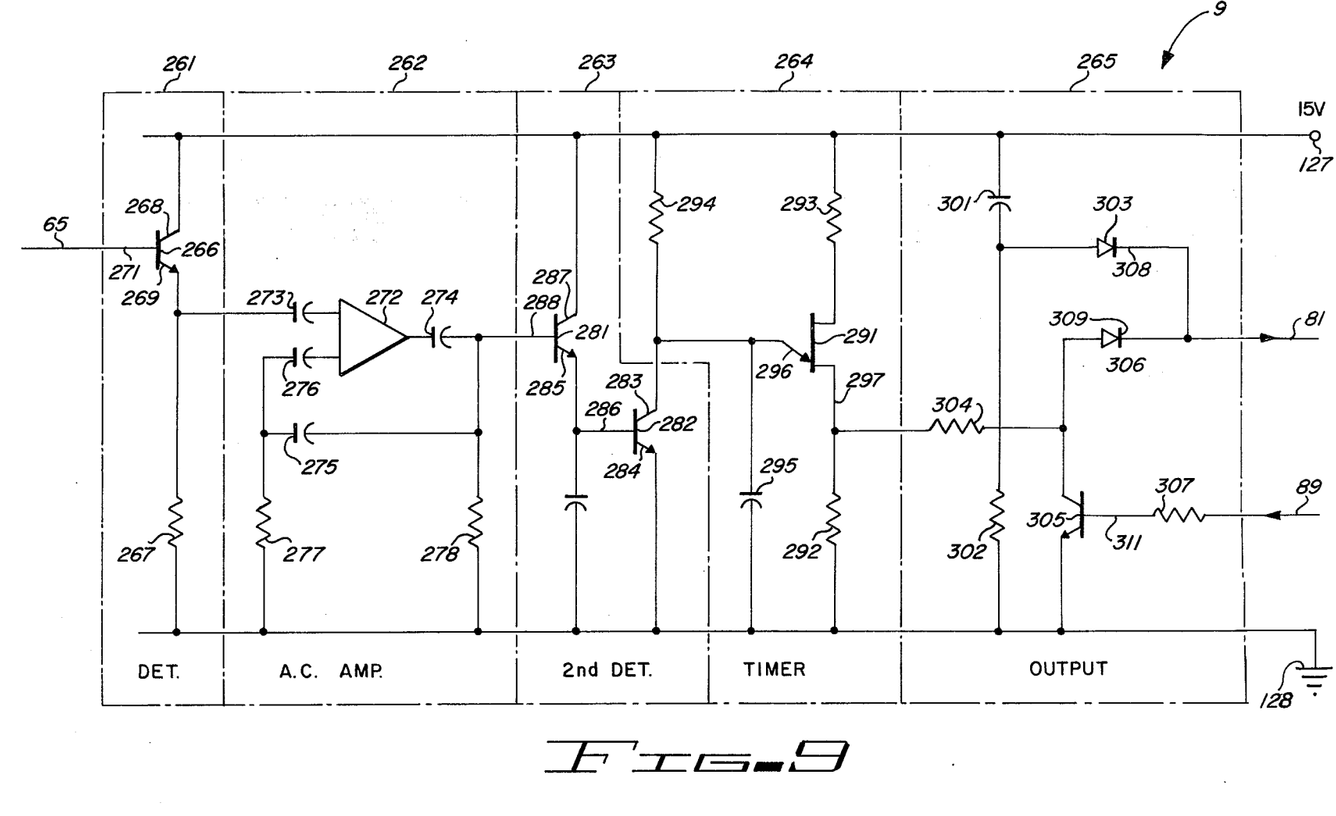
FIG. 9 is a circuit diagram of another audio sensing circuit employed in the invention and shown as circuit block 9 of FIG. 2.

Audio sensor 9 of FIG. 2 is shown in FIG. 9 to include a detector 261, an a-c amplifier 262, a d-c amplifier 263, a timing circuit 264 and an output stage 265.

Sensor 9 is intended to provide a positive pulse at output terminal 81 when the audio signal at input terminal 65 dies out for a given period of time provided sensor 9 is enabled by a ground signal at control terminal 89. In addition, sensor 9 is to supply a positive pulse at terminal 81 when voltage first appears at supply terminal 127.

Operation of the circuit in the provision of these functions occurs as follows;

Detector 261 comprises an NPN transistor 266 and a resistor 267 serially connected between emitter 269 and ground terminal 128, with collector 268 of transistor 266 connected to terminal 127. Base 271 of transistor 266 is connected to input terminal 65. When an a-c signal is present at base 271 of transistor 266, emitter 269 tracks the positive half cycles of the a-c signals but during the negative half cycles, the emitter base junction of transistor 266 is reverse biased. Transistor 266 thus provides rectification of the input signal. At the same time, transistor 266 acts as an amplifier supplying most of the load current drawn at emitter 269 by means of collector emitter current so that only a small current flows into base 271 from input terminal 65.

A-c amplifier stage 262 comprises an integrated circuit amplifier 272, input and output coupling capacitors 273 and 274, respectively, a feedback network including capacitors 275 and 276 and resistor 277, and a terminating or loading resistor 278. Amplifier 262 is designed to respond to gross, relatively long term changes in the average signal level. Thus, if a given signal level has been established at the emitter 269 of transistor 266, an average d-c level exists across resistor 267 and an a-c signal operating about the established d-c level is fed into amplifier 272 through input coupling capacitor 273. An amplified a-c current is supplied by amplifier 272 through capacitor 274, developing an a-c signal across terminating resistor 278.

When the signal at input terminal 65 goes to zero, the a-c signal across resistor 278 also goes to zero.

D-c amplifier 263 acts as a second detector and provides additional amplification. Amplifier 263 includes two NPN transistors 281 and 282. Transistor 282 acts as an output switch with its collector 283 serving as one contact and with its grounded emitter 284 serving as the other contact. Transistor 281 acts as a driver for transistor 282 with the emitter 285 of transistor 281 connected to the base 286 of transistor 282. The collector 287 and the base 288 of transistor 281 are connected, respectively, to supply terminal 127 and to output coupling capacitor 274 of amplifier 262.

When an a-c signal is developed across resistor 278 of the previous stage 262 current flows during each positive half cycle into base 288 to emitter 285, base 286 and emitter 284 to ground terminal 128. By virtue of the amplification factor of transistor 281, an additional and larger current flows from terminal 127 through transistor 281 (collector 287 to emitter 285) into base 286 and emitter 284 of transistor 282 providing a greatly increased level of base drive to transistor 282. Transistor 282 is thus turned on during each positive half cycle of signal current. When the signal disappears, however, transistors 281 and 282 turn off with resistor 278 holding base 288 at ground potential.

Timing circuit 264 is a conventional relaxation oscillator utilizing a unijunction transistor 291, base 1 and base 2 resistors 292 and 293, respectively, timing resistor 294 and timing capacitor 295. A thorough treatment of the unijunction releaxation oscillator is given on pp. 50–53 of the *General Electric Controlled Rectifier Manual*, first edition, copyright 1960 by the General Electric Co. Very briefly, capacitor 295 is charged by a current flowing through resistor 294 unitl the voltage across capacitor 295 exceeds approximately six tenths of the voltage supplied at terminal 127. At this level, the capacitor voltage exceeds the threshhold voltage of transistor 291 and capacitor 295 then discharges rapidly by means of a current flowing into emitter 296 to base 297 of transistor 291 and through resistor 292 to ground terminal 128. During the discharge of capacitor 295 a positive pulse is developed across resistor 292.

In the presence of an audio signal, of course, transistor 282 of the preceeding stage 263 is turned on during the positive half cycles as explained earlier and the capacitor 295 is thus discharged each half cycle of signal voltage so that no appreciable charge is developed. When the signal disappears, however, transistor 282 remains off and the capacitor 295 will charge to the threshhold level in one time constant which is RC product of resistor 294 and capacitor 295. A time constant of approximately 30 seconds is appropriate.

Output stage 265 comprises a start up network including capacitor 301, resistor 302 and diode 303 and a disable network including resistor 304, NPN transistor 305, diode 306 and resistor 307.

Capacitor 301 and diode 303 are serially connected between supply terminal 127 and output terminal 81, the cathode 308 of diode 303 being tied to terminal 81. Resistor 302 is connected from the anode 309 of diode 303 and ground terminal 128. When voltage is first applied at terminal 127, charging current through capacitor 310 develops a positive pulse across resistor 302 and the positive pulse is coupled to output terminal 81 through diode 303.

The positive pulse developed across resistor 292 of previous stage 264 is coupled from base 297 through serially connected resistor 304 and diode 306 to output terminal 81 unless transistor 305 is turned on. Transistor 305 is connected between the anode 309 of diode 306 and ground terminal 128 and its base 311 is connected to enable terminal 89 by resistor 307. When enable terminal 89 is grounded, transistor 305 is off and the pulse is passed through resistor 304 and diode 306 to terminal 81. When terminal 89 is positive, however, as in the MANUAL mode, transistor 305 is turned on and the pulse from base 297 of unijunction transistor 291 flows through resistor 304 and transistor 305 to ground terminal 128.

Figure 10:
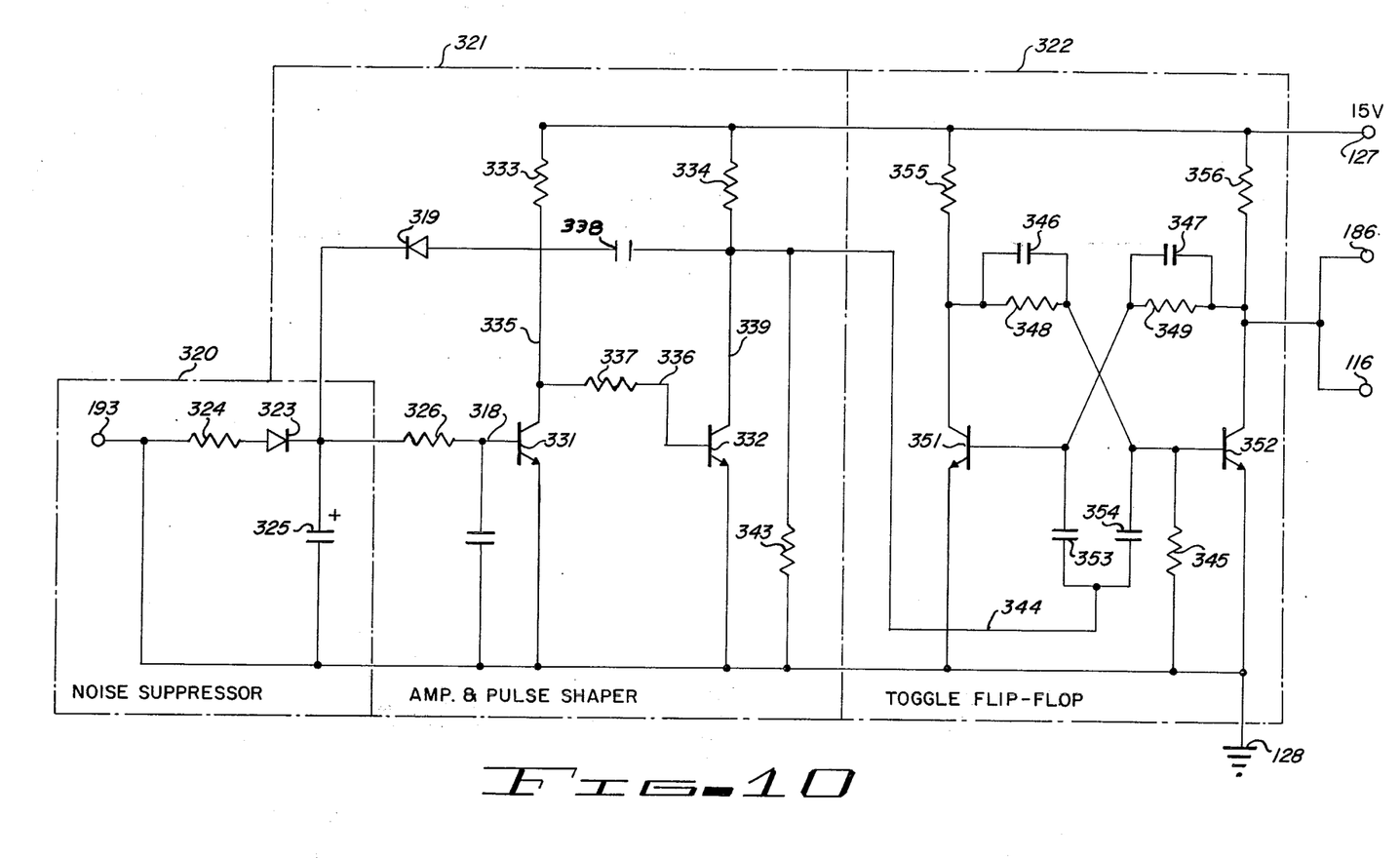
FIG. 10 is a circuit diagram of the automatic/manual control Flip/Flop employed in the invention and shown as circuit block 10 of FIG. 4.

The automatic/manual flip-flop 10 shown in FIG. 10 comprises a noise suppressor stage 320, an amplifier and pulse shaper 321 and a toggle flip-flop 322.

Suppressor stage 320 includes a threshhold diode 323 and an RC integrator comprising resistor 324 and capacitor 325. Stage 320 suppresses electrical noise which is present on the long lines which are connected at input terminal 193 for delivery of control pulses from the remote control unit. The integrator suppresses high frequency signals. Because the signal delivered through diode 323 and resistor 324 has been reduced and its high frequency components removed by suppressor stage 320, its wave shape and amplitude are no longer appropriate to trigger flip-flop 322. Amplifier and pulse shaper 321 is used to restore the desired shape and amplitude.

Amplifier and pulse shaper 321 includes two grounded emitter NPN transistors 331 and 332 with collector resistors 333 and 334, respectively, tied to supply terminal 127. The collector 335 of the first transistor 331 is coupled to the base 336 of the second transistor by resistor 337, while capacitor 338 and serially connected diode 319 connect collector 339 of transistor 332 to the input of shaper 321 at the junction between base resistor 326 of transistor 331 and diode 323.

When a low amplitude positive signal from suppressor 320 begins to turn transistor 331 on, the voltage at collector 335 begins to fall thereby reducing base drive through resistor 337 to transistor 332. Transistor 332 thus begins to turn off and the voltage at its collector 339 begins to rise. The rise of voltage at collector 339 supports a regenerative current to flow from collector 339 through capacitor 338, diode 319 and resistor 326 into base 318 of transistor 331, the regenerative current causing transistor 331 to switch rapidly to the "on" state. Simultaneously, with the rapid turn on of transistor 331, transistor 332 turns rapidly off, its collector voltage rising to a level determined by the divider network comprising resistors 334 and 343.

Toggle flip-flop 322 is similar to flip flop 6A of FIG. 6 with the following exceptions; first, it has only one base emitter resistor 345. Second, it has capacitors 346 and 347 connected in parallel with coupling resistors 348 and 349. Fourth, instead of separate "set" and "reset" terminals, flip flop 222 is "toggled" by a single line 344 which is coupled to the bases of both NPN transistors 351 and 352 by trigger capacitors 353 and 354. As in the case of flip flop 6A, the collectors of the transistors are connected to supply terminal 127 by collector resistors 355 and 356.

The absence of a base emitter resistor for transistor 351 guarantys that transistor 351 rather than transistor 352 will turn on when the equipment is first energized.

The state of flip flop 322 is immediately changed, however, by a signal generated by pulse shaper 321 due to the initial charging of capacitor 338 so that transistor 352 is then turned on setting a ground level at output terminals 186 and 116 and thereby setting the automatic mode as desired.

Capacitors 346 and 347 are essential to the operation of flip flop 322 in the "toggle" mode for which it is desired that the flip flop 322 change its state each time a trigger pulse is injected from line 344. In the presence of the positive trigger pulse, applied to the bases of transistors 351 and 352 through trigger capacitors 353 and 354, both transistors 351 and 352 tend to be turned on. As the pulse decays, however, the capacitor 346 or 347 which is connected to the collector or the transistor 351 or 352 which had been turned off has a residual charge which limits the base drive to the transistor which had previously been turned on and thus causes that transistor not to turn on again.

In the overall operation of automatic/manual flip flop 10 then, each succeeding positive input pulse at terminal 193 causes the output signal at terminal 186 to change state from ground to a positive level or from the positive level back to ground thus setting the manual or the automatic operating mode.

Figure 11:
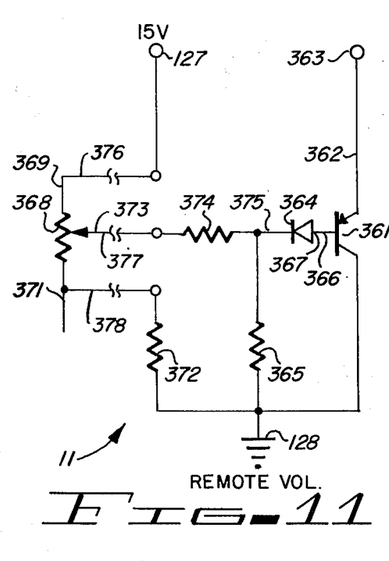
FIG. 11 is a circuit diagram of a remote volume control network designed for use in conjunction with the invention.

The remote volume control circuit 11 as shown in FIG. 11 comprises a grounded collector PNP transistor 361 with its emitter 362 connected to control terminal 363, a diode 364 and a resistor 365 serially connected between the base 366 of transistor 361 and ground terminal 128, the anode 367 of diode 364 being connected to base 366, a potentiometer 368 having its one end 369 connected to source terminal 127, its other end 371 connected through a resistor 372 to ground terminal 128, and its sliding contact arm 373 connected through a resistor 374 to the cathode 375 of diode 364. The potentiometer 368 is located remotely from the rest of the circuit and connecting lines 376, 377 and 378 are thus several feet long. Control terminal 363 is connected to line 216 of amplifier 39 of FIG. 5, its function being to control the volume of amplifier 39 through control of the voltage applied to ground terminals 207 of amplifiers 211A and 211B contained within amplifier 39.

Operation of circuit 11 occurs as follows; the resistive network including potentiometer 368 and resistors 372, 374 and 365 connected between supply terminal 127 and ground terminal 128 establishes a variable voltage at cathode 375 of diode 364, the variable voltage being controllable by means of sliding contact arm 373. Because of the high gain of transistor 361 and the relatively low impedance of the above resistive network, the loading effect of connected transistor 361 is negligible and the emitter voltage of transistor 361 and hence the voltage at control terminal 363 tracks the voltage set at cathode 375, the greater part of the ground current injected at terminal 366 passing through transistor 361 directly to ground terminal 128.

Figure 12:
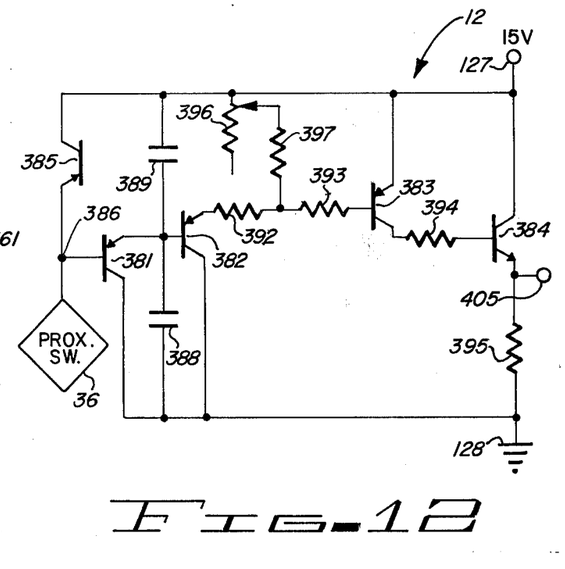
FIG. 12 is a circuit diagram of the Proximity Amplifier, a number of which are employed in the invention and shown as circuit blocks 12A, 12B, 12C and 12D in FIG. 4.

Each of the proximity amplifiers 12A–12D of FIG. 4 has the circuit configuration of amplifier 12 of FIG. 12. The proximity amplifier 12 has four stages of amplification associated with four transistors 381, 382, 383 and 384. The first stage which is associated with transistor 381 is a very high impedance amplifier utilizing in addition to grounded collector PNP transistor 381 another open base PNP transistor 385 connected to provide a high value of resistance between base 386 and source terminal 127. Connected in this manner transistor 385 provides a temperature stabilized bias current which holds transistor 381 in an "off" condition, the bias current increasing with temperature as required to offset increased leakage current in transistor 381.

Proximity switch 36, which is simply a conductive plane, and base 386 of transistor 381 are thus held at a positive potential relative to ground terminal 128 by transistor 385. When the operator's finger is brought into proximity with switch 36 the positive charge residing on switch 36 and base 386 is momentarily discharged to ground through the stray capacity existing between switch 36 and the body of the operator which is also capacitively coupled to ground. As switch 36 and base 386 thus approach ground potential, transistor 381 is pulsed to an "on" condition, its emitter-to-collector current discharging capacitors 389 and 388 and providing base drive to transistor 382. The resulting emitter-collector current of transistor 382 in turn provides base drive to transistor 383 through resistors 392 and 393 and finally, the resulting emitter-to-collector current of transistor 383 is supplied through collector resistor 394 as base drive to transistor 384 which provides the final stage of amplification and delivers a positive output signal to terminal 405 across emitter resistor 395.

The initial bias and threshhold levels for all four transistors 381, 382, 383 and 384 are set by means of variable resistor 396 and fixed resistor 397 which are serially connected between source 127 and the junction between serially connected resistors 392 and 393.

Capacitors 389 and 388 prevent proximity amplifier 12 from responding to high frequency noise or to random noise signals of very short duration. Because of the charge held by these capacitors such short term noise signals are not effective in altering the potentials and thus amplifier 12 does not respond.

From the foregoing detailed description, it will be readily seen that a new and improved automatic control system has been provided for a home entertainment center in accordance with the objects of the invention. While the circuits incorporate numerous features and desirable functions, they may be assembled on printed circuit boards in a very limited space and at a reasonable cost using readily available integrated circuits and other components.

Although but a single embodiment of the present invention has been illustrated and described, it will be apparent to those skilled in the art that various changes and modifications may be made therein without departing from the spirit of the invention or from the scope of the appended claims.

What is claimed is:

1. An automatic electronic control system for an entertainment system utilizing audio signal sensors for the preferential selection of a first signal source with means for turning it to a second signal source upon cessation of the signal from said first signal source, said control system comprising:
   a first input signal terminal for connection to a preferential first signal source,
   a second input signal terminal for connection to a second signal source,
   switching means comprising input, output and control terminals for selectively connecting either said first input signal source or said second input signal source to an audio output terminal,
   an audio output terminal connected to said switching means output terminal for connection to a speaker system,
   a first audio sensing circuit comprising input, output and control terminals for interconnecting said first input signal terminal and said switching means,
   a second audio sensing circuit comprising input, output and control terminals,
   said input terminal of said first audio sensing circuit being connected to said first input signal terminal and said output terminal of said first audio sensing circuit being connected to an input terminal of said switching means,
   said control terminal of said first audio sensing circuit being connected to said control terminal of said second audio sensing circuit,
   said input terminal of said second audio sensing circuit being connected to said switching means output terminal and said output terminal of said second audio sensing circuit being connected to an input terminal of said switching means, said second input signal terminal being connected to an input terminal of said switching means,
   said switching means upon energization of said control system connecting said second input signal terminal to said audio output terminal,
   said first audio sensing circuit upon sensing a signal at said first input signal terminal generating a control signal to actuate said switching means to connect said first input signal terminal to said audio output terminal,
   said second audio sensing circuit upon termination of signals from said first input signal terminal existing at said audio output signal terminal transmitting a signal from its output terminal to a control terminal of said switching means to reconnect said second signal input terminal to said audio output signal terminal.

2. The automatic electronic control system set forth in claim 1 in further combination with:
   means for delaying the actuation of said switching means to reconnect said second signal terminal to said audio output terminal for a predetermined interval of time.

3. The automatic electronic control system set forth in claim 1 in further combination with:
   a switch connected to said first audio sensing circuit for controlling the transmission of said control signal of said first audio sensing circuit to said switching means.

4. The automatic electronic control system set forth in claim 3 wherein:
   said switch comprises a proximity switch.

5. An automatic electronic control system for an entertainment system utilizing audio signal sensors for the preferential selection of a first signal source with means for turning it to a second signal source upon cessation of the signal from said first signal source, said control system comprising:
   a first input signal terminal for connection to a first signal source,
   a second input signal terminal for connection to a second signal source,
   an audio switching network having input, output and control terminals,
   a third input signal terminal connected to an input of said audio switching network, an audio output signal terminal connected to said switching network output terminal for connection to a speaker system, a first audio sensing circuit comprising input, output and control terminals for interconnecting said first input signal terminal and said switching network, a second audio sensing circuit comprising input, output and control terminals for connecting said second input signal terminal and said switching network, said input terminal of said first audio sensing circuit being connected to said first input signal terminal and said output terminal of said first audio sensing circuit being connected to an input terminal of said audio switching network, said control terminal of said first audio sensing circuit being connected to said control terminal of said second audio sensing circuit, said input terminal of said second audio sensing circuit being connected to said second input signal terminal and said output terminal of said second audio sensing circuit being connected to an input terminal of said audio switching network, a third audio sensing circuit having input and output terminals for selectively connecting either said third input signal source or preferentially said first input signal source or said second input signal source to said audio output signal terminal, means for connecting an output terminal of said audio switching network to said input terminal of said third audio sensing circuit and for connecting the output terminal of said third audio sensing circuit to a control terminal of said audio switching network for controlling the transmission of signals from said first, second and third input signal terminals to said audio output signal terminal, said audio switching network upon energization of said control system generating a signal and transmitting it through its output terminal to said third audio sensing circuit to transmit signals on said third signal input terminal to said audio output signal terminal, said first audio sensing circuit sensing a signal at said first input signal terminal and generating a control signal at an input terminal of said audio switching network, said audio switching network upon receipt of said control signal of said first audio sensing circuit transmitting a signal from its output terminal to said third audio sensing circuit to connect said first input signal terminal to said audio output signal terminal, said third audio sensing circuit upon termination of signals from either said first or second input signal terminals existing at said audio output signal terminal transmitting a signal from its output terminal to said audio switching network to reconnect said third signal input terminal to said audio output signal terminal.

6. The automatic electronic control system set forth in claim 5 further comprising;

means for delaying the actuation of said switching network to reconnect said third signal terminal to said audio output signal terminal for a predetermined interval of time whereby short interruptions of signals on said first or second input signal terminals will not cause a switching of said control system back to said third input signal terminal.

7. The automatic electronic control system set forth in claim 5 wherein;

said audio switching network comprises a selection switch means for manually energizing said switching network for connecting any one of the input signal terminals to said audio output signal terminal.

8. The automatic electronic control system set forth in claim 7 wherein;

said selection switch means comprises a plurality of proximity switches.

* * * * *